(12) United States Patent
Vanjani

(10) Patent No.: US 10,615,489 B2
(45) Date of Patent: Apr. 7, 2020

(54) WEARABLE ARTICLE APPARATUS AND METHOD WITH MULTIPLE ANTENNAS

(71) Applicant: Futurewei Technologies, Inc., Plano, TX (US)

(72) Inventor: Kiran Vanjani, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/177,273

(22) Filed: Jun. 8, 2016

(65) Prior Publication Data

US 2017/0358850 A1    Dec. 14, 2017

(51) Int. Cl.
| | |
|---|---|
| *H01Q 1/27* | (2006.01) |
| *H01Q 5/30* | (2015.01) |
| *H01Q 1/24* | (2006.01) |
| *H01Q 21/28* | (2006.01) |
| *H01Q 1/52* | (2006.01) |
| *G06F 1/16* | (2006.01) |

(Continued)

(52) U.S. Cl.
CPC .............. *H01Q 1/273* (2013.01); *G04G 17/04* (2013.01); *G04G 21/04* (2013.01); *G06F 1/163* (2013.01); *G06F 1/1656* (2013.01); *G06F 1/1658* (2013.01); *G06F 1/1698* (2013.01); *H01Q 1/243* (2013.01); *H01Q 1/44* (2013.01); *H01Q 1/521* (2013.01); *H01Q 5/30* (2015.01); *H01Q 5/35* (2015.01); *H01Q 21/28* (2013.01)

(58) Field of Classification Search
CPC .......... H01Q 1/273; H01Q 5/30; H01Q 1/243; H01Q 21/28

USPC ......................................................... 343/718
See application file for complete search history.

(56) References Cited

U.S. PATENT DOCUMENTS

| | | | |
|---|---|---|---|
| 4,120,148 A | 10/1978 | Moyer | |
| 4,673,936 A * | 6/1987 | Kotoh | G01S 1/68 |
| | | | 342/385 |

(Continued)

FOREIGN PATENT DOCUMENTS

| | | |
|---|---|---|
| CN | 1581572 A | 2/2005 |
| CN | 101091288 A | 12/2007 |

(Continued)

OTHER PUBLICATIONS

Fossil, "Q Founder Digital Display Two-Tone Stainless Steel Touchscreen Smartwatch," pp. 1-9, retrieved on Apr. 13, 2016 from https://www.fossil.com/us/en/wearable-technology/connected-accessories/smartwatches-display/q-founder-digital-display-two-tone-stainless-steel-touchscreen-smartwatch-sku-ftw20021p.html.

(Continued)

*Primary Examiner* — Hai V Tran
*Assistant Examiner* — Bamidele A Jegede
(74) *Attorney, Agent, or Firm* — Fish & Richardson P.C.

(57) ABSTRACT

An apparatus and method are provided for a wearable article with multiple antennas. The wearable article includes a body, a first structure positioned in the body, and a plurality of first electronic components mounted on the first structure. Further included is a second structure positioned in the body beneath and spaced from the first structure, and a plurality of second electronic components mounted on the second structure. A first antenna is in electrical communication with at least one of the first electronic components, and a second antenna is in electrical communication with at least one of the second electronic components.

19 Claims, 9 Drawing Sheets

(51) Int. Cl.
*H01Q 1/44* (2006.01)
*H01Q 5/35* (2015.01)
*G04G 17/04* (2006.01)
*G04G 21/04* (2013.01)

(56) References Cited

U.S. PATENT DOCUMENTS

| | | | | |
|---|---|---|---|---|
| 4,817,196 | A * | 3/1989 | MacNak | H01Q 1/27 343/718 |
| 5,007,105 | A * | 4/1991 | Kudoh | G08B 5/228 340/407.1 |
| 5,307,520 | A * | 4/1994 | Oyamada | G08B 3/1058 368/204 |
| 5,410,749 | A * | 4/1995 | Siwiak | H01Q 1/247 340/7.63 |
| 5,699,319 | A * | 12/1997 | Skrivervik | G04G 21/04 343/718 |
| 6,112,102 | A | 8/2000 | Zhinong | |
| 6,278,873 | B1 * | 8/2001 | Itakura | G04G 17/02 455/347 |
| 6,373,439 | B1 * | 4/2002 | Zurcher | G04B 47/00 343/702 |
| 7,586,463 | B1 * | 9/2009 | Katz | H01Q 1/08 343/718 |
| 8,774,855 | B2 | 7/2014 | Sanchez et al. | |
| 2002/0098807 | A1 * | 7/2002 | Saarnimo | H04B 1/385 455/74 |
| 2003/0076660 | A1 * | 4/2003 | Horie | H01Q 23/00 361/760 |
| 2003/0169207 | A1 * | 9/2003 | Beigel | G06K 19/07762 343/718 |
| 2004/0090868 | A1 * | 5/2004 | Endo | G04G 21/04 368/10 |
| 2004/0150578 | A1 * | 8/2004 | Nomura | H01Q 1/1207 343/788 |
| 2004/0231159 | A1 | 11/2004 | Shibuya et al. | |
| 2004/0233789 | A1 * | 11/2004 | Oguchi | G04C 3/008 368/47 |
| 2006/0126438 | A1 * | 6/2006 | Itou | G04G 17/08 368/47 |
| 2007/0091004 | A1 * | 4/2007 | Puuri | H01Q 1/273 343/718 |
| 2008/0018539 | A1 * | 1/2008 | Jung | H01Q 1/243 343/700 MS |
| 2008/0136734 | A1 * | 6/2008 | Manholm | H01Q 9/0414 343/893 |
| 2009/0003141 | A1 * | 1/2009 | Ozawa | G04G 17/08 368/294 |
| 2009/0051611 | A1 * | 2/2009 | Shamblin | H01Q 1/243 343/747 |
| 2009/0147630 | A1 | 6/2009 | Clerc et al. | |
| 2009/0305657 | A1 * | 12/2009 | Someya | H01Q 1/273 455/269 |
| 2010/0060540 | A1 | 3/2010 | Abe | |
| 2010/0144300 | A1 * | 6/2010 | Someya | H01Q 1/273 455/233.1 |
| 2010/0188307 | A1 * | 7/2010 | Murata | H01Q 1/273 343/788 |
| 2010/0202325 | A1 | 8/2010 | Poulin et al. | |
| 2011/0003665 | A1 * | 1/2011 | Burton | G04F 10/00 482/9 |
| 2011/0309994 | A1 * | 12/2011 | Kato | H01P 1/20345 343/860 |
| 2012/0069716 | A1 * | 3/2012 | Peng | G04G 21/04 368/10 |
| 2012/0092822 | A1 * | 4/2012 | Mooring | G04G 17/04 361/679.21 |
| 2012/0112969 | A1 | 5/2012 | Caballero | |
| 2012/0206302 | A1 * | 8/2012 | Ramachandran | H01Q 1/24 343/702 |
| 2012/0280871 | A1 | 11/2012 | Shamblin et al. | |
| 2012/0286049 | A1 * | 11/2012 | McCormack | H04B 1/40 235/492 |
| 2012/0319912 | A1 * | 12/2012 | Taguchi | G06K 19/07345 343/788 |
| 2013/0016016 | A1 * | 1/2013 | Lin | H01Q 1/273 343/702 |
| 2013/0050027 | A1 * | 2/2013 | Kim | H01Q 1/243 343/700 MS |
| 2013/0070817 | A1 * | 3/2013 | McCormack | H04B 1/18 375/219 |
| 2013/0169504 | A1 * | 7/2013 | Jenwatanavet | H01Q 1/242 343/848 |
| 2013/0265199 | A1 * | 10/2013 | Koskiniemi | G01S 19/14 342/450 |
| 2013/0307731 | A1 | 11/2013 | Vanjani et al. | |
| 2014/0054058 | A1 * | 2/2014 | Myers | G06F 1/1626 174/50 |
| 2014/0078017 | A1 | 3/2014 | Vanjani et al. | |
| 2014/0086026 | A1 * | 3/2014 | Mitani | G04R 60/12 368/278 |
| 2014/0132465 | A1 | 5/2014 | Sanchez et al. | |
| 2014/0134958 | A1 | 5/2014 | Sanchez et al. | |
| 2014/0135058 | A1 | 5/2014 | Sanchez et al. | |
| 2014/0180365 | A1 * | 6/2014 | Perryman | H01Q 1/40 607/60 |
| 2014/0187284 | A1 | 7/2014 | Sanchez et al. | |
| 2014/0198012 | A1 * | 7/2014 | Tseng | H01Q 21/28 343/876 |
| 2014/0213324 | A1 | 7/2014 | Tan et al. | |
| 2014/0225786 | A1 * | 8/2014 | Lyons | H01Q 1/273 343/702 |
| 2014/0253393 | A1 * | 9/2014 | Nissinen | H01Q 1/36 343/702 |
| 2014/0253394 | A1 * | 9/2014 | Nissinen | H01Q 7/00 343/702 |
| 2014/0253410 | A1 | 9/2014 | DiNallo et al. | |
| 2014/0266935 | A1 | 9/2014 | Tankiewicz | |
| 2014/0300518 | A1 * | 10/2014 | Ramachandran | H01Q 1/243 343/702 |
| 2014/0370824 | A1 | 12/2014 | Larsen et al. | |
| 2015/0349410 | A1 * | 12/2015 | Russell | H01Q 1/273 343/702 |
| 2016/0013544 | A1 | 1/2016 | Lyons et al. | |
| 2016/0020738 | A1 | 1/2016 | Lee et al. | |
| 2016/0062417 | A1 * | 3/2016 | Chu | G06F 1/1698 600/390 |
| 2016/0063232 | A1 * | 3/2016 | Seol | G06F 3/03547 726/19 |
| 2016/0064804 | A1 * | 3/2016 | Kim | H01Q 1/243 343/702 |

FOREIGN PATENT DOCUMENTS

| | | |
|---|---|---|
| CN | 101816078 A | 8/2010 |
| CN | 101938541 A | 1/2011 |
| CN | 103676632 A | 3/2014 |
| CN | 104160551 A | 11/2014 |
| CN | 204441471 U | 7/2015 |
| CN | 105161846 A | 12/2015 |
| CN | 105281690 A | 1/2016 |
| CN | 105453339 A | 3/2016 |
| EP | 0443491 A1 | 8/1991 |
| EP | 2062282 B1 | 1/2012 |
| EP | 2975774 A1 | 1/2016 |
| JP | 2003066169 A | 3/2003 |

OTHER PUBLICATIONS

Tag Heuer, "TAG Heuer Connected," www.tagheuerconnected.com, Apr. 6, 2016, pp. 1-8.

Apple, "Apple Watch," pp. 1-6, retrieved on Apr. 13, 2016 from www.apple.com/watch.

Painter, L., "ZTE Axon Watch review: Hands-on with a sleek and gorgeous faux Android Wear smartwatch that'll never hit the UK," PC Advisor, Mar. 3, 2016, pp. 1-3, retrieved from www.pcadvisor.co.uk/review/wearable-tech/zte-axon-watch-review-uk-availability-design-spec-software-mwc-2016-3636145/.

(56) References Cited

OTHER PUBLICATIONS

Technology Pep, "Rockioo Watch: A New Stand-Alone SmartWatch," pp. 1-5, retrieved on Apr. 13, 2016 from www.technologypep.com/rockioo-watch-a-new-stand-alone-smartwatch.html.
Vanjani et al., U.S. Appl. No. 14/806,548, filed Jul. 22, 2015.
Fried, I., "Timex Teams With Qualcomm, AT&T for Cell-Equipped Smartwatch," re/code, Aug. 5, 2014, pp. 1-2, retrieved from http://recode.net/2014/08/05/timex-teams-up-with-qualcomm-and-att-for-cellular-equipped-smartwatch/.
"Internet of Things," 2014, pp. 1-54, retrieved from http://connected1503.rssing.com/chan-25997370/all_p7.html.
Tinari, G., "AT&T unveils FiLIP, a smartwatch for kids and parents," Oct. 8, 2013, p. 1, retrieved from http://www.neowin.net/news/att-unveils-filip-a-smartwatch-for-kids-and-parents.
"Motorola Moto 360 Teardown," iFixit, 2014, pp. 1-14, retrieved from https://www.ifixit.com/Teardown/Motorola+Moto+360+Teardown/28891.
"Qualcomm Toq Smartwatch TopSW1," TechInsights, 2014, pp. 1-25, retrieved from http://www.techinsights.com/uploadedFiles/Public_Website/Content_-_Primary/Teardowncom/Sample_Reports/Wearable-Wellness_Survey_Sample_Report.pdf.
International Search Report from International Application No. PCT/CN2016/090324, dated Oct. 21, 2016.
Non-Final Office Action from U.S. Appl. No. 14/806,548 dated Feb. 24, 2017.
Office Action issued in Japanese Application No. 2018561673 dated Oct. 29, 2019, 9 pages (With English Translation).
Office Action issued in Chinese Application No. 201780025526.7 dated Nov. 25, 2019, 10 pages.

\* cited by examiner

WEARABLE ARTICLE APPARATUS AND METHOD WITH MULTIPLE ANTENNAS

FIELD OF THE INVENTION

The present invention relates to antennas, and more particularly to antennas for wearable articles.

BACKGROUND

Relatively recently, a new market segment in the form of computerized wearables has been experiencing sizeable growth. For example, "smart" watches are gaining popularity, particularly among smart phone users. Typically, the aforementioned smart watches are equipped with short-range transceivers (e.g. BLUETOOTH, Wi-Fi, etc.) for providing communication between the smart watch and the smart phone. Some of these smart watches also have global positioning system (GPS) connectivity, as well.

Thus, while such smart watches are equipped with the necessary infrastructure (e.g. circuitry, antennas, etc.) to accommodate such short-range communication, there has been a lack of long-range communication support. An example of such long-range communication includes cellular communication, for instance. While there are many challenges in incorporating cellular user equipment (UE) infrastructure into a smart watch, incorporation of a sufficient antenna poses a particular challenge. This is particularly the case when the aforementioned UE infrastructure is expected to support protocols, wireless standards, etc. that require multiple antennas that are properly isolated.

For example, it is very challenging to have cellular signals resonate at multiple bands when placed in an all-metal housing, that are typical of traditional watches. Even in non-metallic smart watch environments, other challenges (e.g. size constraints, etc.) also exist. Further, any attempt to incorporate multiple properly-isolated antennas in a wearable such as a smart watch would be even more frustrated by the aforementioned issues.

SUMMARY

An apparatus and method are provided for a wearable article with multiple antennas. The wearable article includes a body, a first structure positioned in the body, and a plurality of first electronic components mounted on the first structure. Further included is a second structure positioned in the body beneath and spaced from the first structure, and a plurality of second electronic components mounted on the second structure. A first antenna is in electrical communication with at least one of the first electronic components, and a second antenna is in electrical communication with at least one of the second electronic components.

In a first embodiment, the wearable article may include a watch. Further, each of the plurality of antennas may be attached to the body of the watch. For example, at least one of the plurality of antennas may be included as at least a part of a bezel of the watch, and at least one of the plurality of antennas may be included as at least a part of a back plate of the watch. Still yet, the back plate of the watch may include an insulated region that is situated thereon to abut skin of the mammal when the watch is worn.

In a second embodiment (which may or may not be combined with the first embodiment), the plurality of antennas may be attached to different portions of the wearable article. Further, insulation may be positioned between the different portions of the wearable article.

In a third embodiment (which may or may not be combined with the first and/or second embodiments), the second structure may be attached to the body so as to be at least partially electrically isolated from the first structure as a result of an insulation (e.g. air space, etc.) therebetween. Still yet, the first structure and the second structure may each reside in different spaced parallel planes, and may even include different printed circuit boards. Even still, the plurality of antennas may be excited using different contacts that are misaligned.

In a fourth embodiment (which may or may not be combined with the first, second, and/or third embodiments), an active tuner may be provided for exciting at least one of the plurality of antennas. Further, the plurality of antennas may be configured for radiating cellular radio frequency (RF) signals. Still yet, the plurality of antennas may take a form of a multiple-in-multiple-out (MIMO) antenna.

To this end, in some optional embodiments, the aforementioned apparatus and method may operate both a bezel and a back plate of a watch as antennas to afford a watch with multiple antennas. As an option, such multiple antennas may be insulated from a body of the watch and may be excited from separate insulated structures (e.g. printed circuit boards, etc.) using misaligned contacts. One or more of such structural features may, in turn, afford antennas that allow cellular signals to resonate at multiple bands with sufficient performance characteristics. It should be noted that the aforementioned potential advantages are set forth for illustrative purposes only and should not be construed as limiting in any manner.

DETAILED DESCRIPTION

Figure 1:
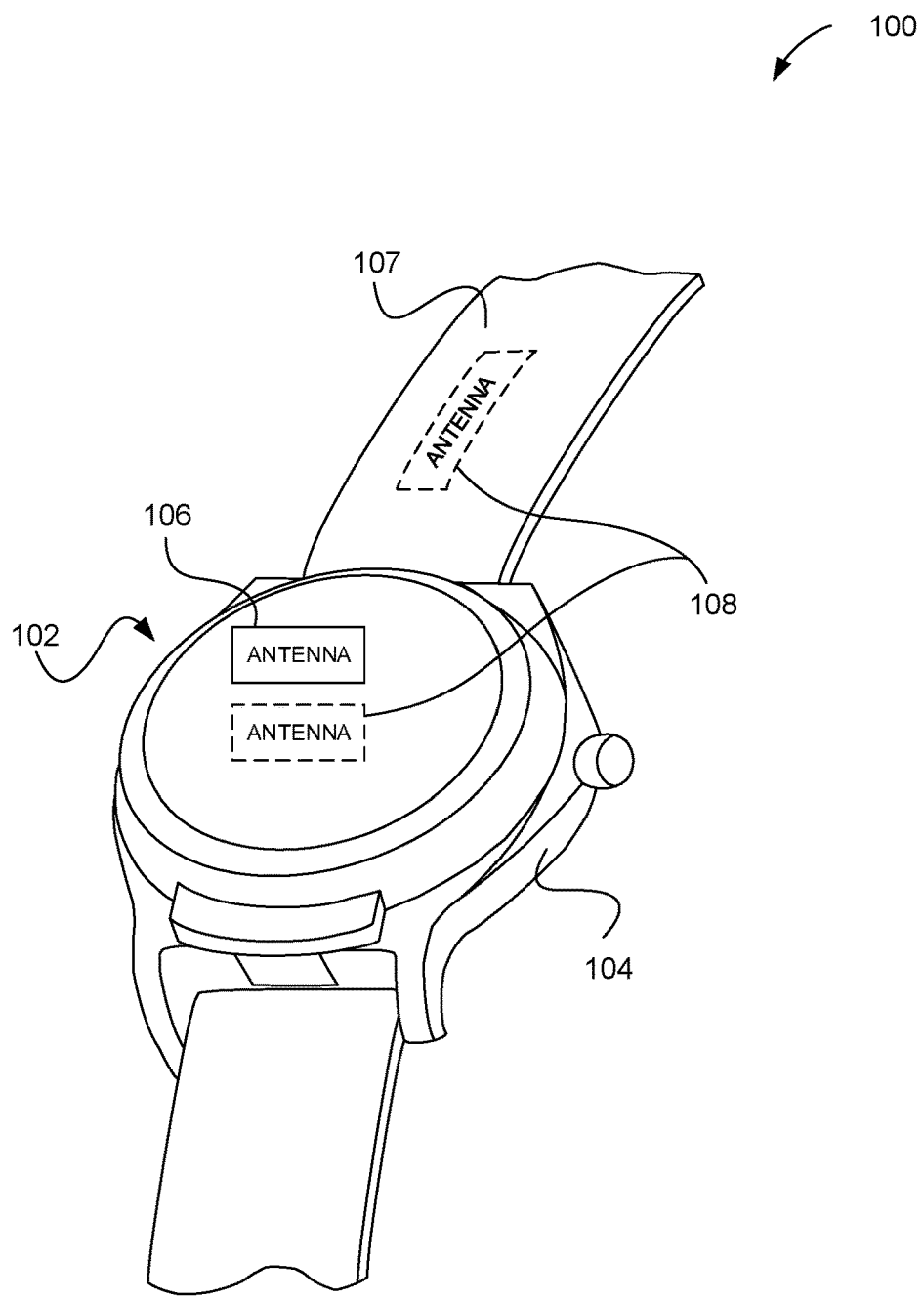
FIG. 1 illustrates a wearable article equipped with multiple antennas, in accordance with one embodiment.

FIG. 1 illustrates a wearable article 100 equipped with multiple antennas 102, in accordance with one embodiment. In the context of the present description, the wearable article 100 may refer to any article that is suitable to be worn by a mammal including, but not limited to a human. Just by way of example, in one embodiment, the wearable article 100 may include a watch like the one shown in FIG. 1.

In other embodiments, the wearable article 100 may include a "smart" watch that includes processing and communication capabilities. In still other embodiments, the wearable article 100 may include, but is not limited to a ring, headphones, wearable speakers, a hat, eye or sun glasses, virtual reality equipment, a wristband, a fitness wearable, a heart monitor, a collar, and/or any other article suitable to be worn. Even still, the wearable article 100 may or may not be configured to communicate and interoperate with other devices including, but not limited to a mobile device [e.g. phone, tablet, laptop, personal digital assistant (PDA), etc.], a computer, one or more other wearables, and/or any other device, for that matter.

As shown in the watch embodiment of FIG. 1, the wearable article 100 includes a body 104. In the context of the present description, the body 104 may include any housing configured to have at least one antenna 106 of the multiple antennas 102 attached thereto, and further house other electronic and/or mechanical componentry. In the context of the present description, the term "attach" may refer to any direct coupling (e.g. integral coupling, coupling of discrete components that directly abut, etc.), or indirect coupling (e.g. coupling of discrete components with one or more components (such as insulation, etc.) therebetween, etc.). Further, while the body 104 is shown to be circular in shape in the present embodiment, it should be noted that other shapes (e.g. rectangle, oval, square, etc.) are contemplated, as will soon become apparent. Still yet, the term antenna may refer to any conductive element configured for receiving and/or sending radio frequency (RF) signals. To this end, the phrase "plurality of antennas" may refer to any set of two or more conductive elements configured for receiving and/or sending RF signals.

Strictly as an option, further included as part of the wearable article 100 may be a mammal coupling 107 attached to the body 104 for coupling the wearable article 100 to a mammal (e.g. human, etc.). In the context of the present description, such mammal coupling 107 may include a strap with any desired attachment mechanism (e.g. buckle, hook & loop fastener, magnet, etc.). In varying embodiments, the mammal coupling 107 may or may not be constructed using the same material (e.g. metal, plastic or other insulative material, etc.) as the body 104 and other watch components, depending on design factors involving a balance of aesthetics and functionality.

In other embodiments involving other types of wearables, the mammal coupling 107 may take other forms. Just by way of example, eye or sun glasses may include arms or a bridge as a suitable mammal coupling, while earphones may include a circular or bulbous shape as a suitable mammal coupling, and a ring may include an annular band as a suitable mammal coupling. Even still, when used by other types of mammals (e.g. pets, etc.), the wearable may take the form of a collar with a portion thereof being a suitable mammal coupling.

In the context of the present description, the aforementioned multiple antennas 102 may each include any conductive element that is capable of being used to communicate (e.g. transmit and/or receive, etc.) radio-frequency (RF) signals. While such RF signals may, in one embodiment, include multi-band-multi-mode cellular RF signals (or other long-range signals such as 2G/3G/4G/LTE/LTE-Advanced signals, etc.), it should be noted that, in other embodiments, any RF signals (e.g. short-range signals such as BLUETOOTH, Wi-Fi, near-field, etc.) may be utilized alone or in combination with each other. Further, it is contemplated that each of the multiple antennas 102 may service the same transceiver and/or communication protocol or, in other embodiments, service different transceivers and/or communication protocols; either simultaneously and/or utilizing a desired multiplexing technique.

Even still, one or more of the antennas 102 may take any desired configuration. For example, in one embodiment, one or more of the antennas 102 may include a multiple-in-multiple-out (MIMO) antenna (e.g. N×N WiFi or cellular MIMO antenna, where N=2, 3, 4, or any integer). Thus, in one embodiment, two or more of the antennas 102 may be used as both a source (e.g. transmitter, etc.) and a destination (e.g. receiver, etc.). Still yet, one or more of the antennas 102 may or may not be steerable, and/or be operable for use with an active tuner for advanced signaling. Additionally, the one or more of the antennas 102 may be supported by control circuitry that is configured to selectively and/or dynamically activate different antenna(s) 102, based on specific use cases, in order to avoid interference.

For example, in one embodiment, such control circuitry may use multiplexing or any other desired isolation technique for exciting a first one of the antennas 102 during a first time period, and exciting a second one of the antennas 102 during a second time period (that does not overlap the first time period, at least in part). Thus, RF signals from the first one of the antennas 102 are less likely to affect those from the second one of the antennas 102. In the context of the present description, the term excite may refer to any application of voltage to one or more of the antennas 102 for causing the same to emit RF signals. As will be elaborated upon in the context of subsequently described embodiments, such excitation may be caused by any desired control circuitry and/or other supporting electrical componentry.

Further, in different embodiments, the at least one antenna 106 may be attached to the body 104 so as to be positioned at least partially inside and/or outside of the body 104. Still yet, the at least one antenna 106 may or may not constitute a component of the body 104 such that it is included as at least a part of a bezel, back plate, pusher and/or any other part of the body 104. To this end, the at least one antenna 106 may, in some embodiments, perform a function (e.g. enclosing/protecting internal componentry, receiving user input, conveying output, etc.) beyond an antenna function.

As shown in FIG. 1, the at least one antenna 106 is attached to the body 104, while an additional one or more antennas 108 is shown (in phantom) so as to emphasize that such additional antenna(s) 108 may be positioned anywhere (e.g. attached, separate, etc.) with respect to the body 104. Specifically, the additional antenna(s) 108 may also be attached to the body 104 or, in other embodiments, be attached elsewhere (e.g. attached to the strap 107, etc.). Further, while a limited number of antennas 102 are illustrated in FIG. 1, it should be noted that any number of antennas 102 may be employed. For example, in some embodiments, four, eight, or even more antennas may be attached to the wearable article 100.

More illustrative information will now be set forth regarding various optional architectures and uses in which the foregoing method may or may not be implemented, per the desires of the user. Specifically, as will be described in further detail during the description of subsequent embodiments, the wearable article may further include a first structure positioned in the body, and a plurality of first electronic components mounted on the first structure. Further included is a second structure positioned in the body beneath and spaced from the first structure, and a plurality of second electronic components mounted on the second structure. A first antenna is in electrical communication with at least one of the first electronic components, and a second antenna is in electrical communication with at least one of the second electronic components. It should be noted that the following information is set forth for illustrative purposes and should not be construed as limiting in any manner. Any of the following features may be optionally incorporated with or without the exclusion of other features described.

Figure 2:
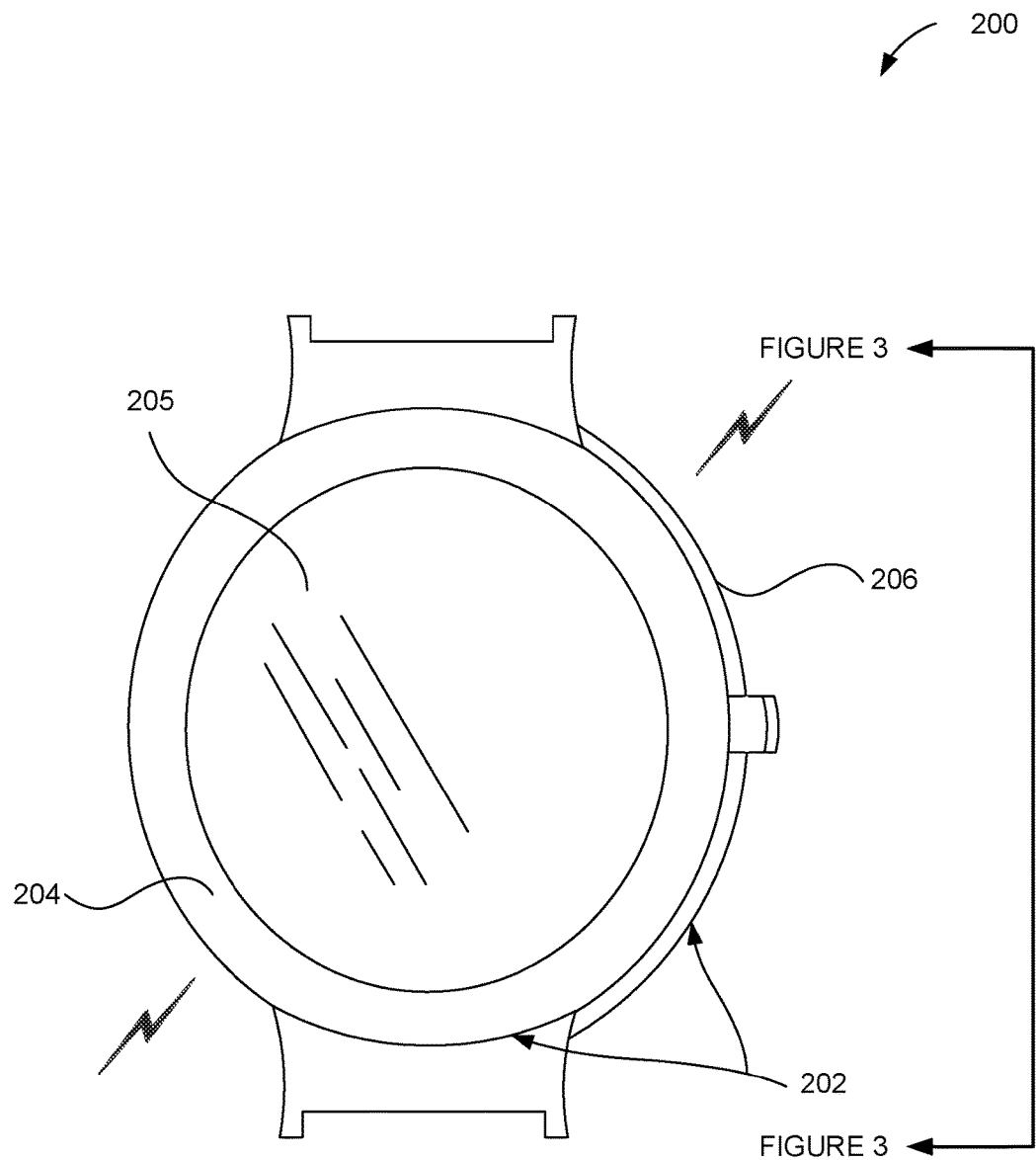
FIG. 2 is a perspective view of a watch equipped with multiple antennas, in accordance with another embodiment.

FIG. 2 is a perspective view of a watch 200 equipped with multiple antennas 202, in accordance with another embodiment. As an option, the watch 200 may be constructed to include any feature(s) of one or more of the embodiments set forth in any previous and/or subsequent figure(s) and/or the description thereof. Further, while the watch 200 is shown to be oval-shaped in the current (and subsequent) figures, it should be noted that the watch 200 may take on any shape (e.g. rectangular, circular, etc.) in different embodiments. With that said, it is to be appreciated that the watch 200 may be constructed in any desired manner.

As shown, the watch 200 includes a bezel 204 that is constructed, at least in part, from a conductive material so as to serve also as a first antenna. While not shown, the bezel 204 may include ornamental indicia and/or engravings. Further, in other embodiments involving a circular-shaped watch 200, the bezel 204 may be configured to swivel about a central axis of the watch 200.

Also included is a watch face 205 that is encompassed by the bezel 204. In one embodiment, the watch face 205 may take the form of a touchscreen that enables electronic display of computing output, as well as user input via manipulation of the touchscreen. In other embodiments, the watch face 205 may take the form of a transparent plastic and/or glass panel.

Further, the watch 200 may include a back plate 206 that is constructed, at least in part, from a conductive material so as to serve also as a second antenna. As will become apparent during the description of subsequent figures, various insulators and other design features may be incorporated to at least partially isolate the bezel 204 and the back plate 206 to enhance a performance of such respective antennas.

To afford antenna functionality, the bezel 204 and/or back plate 206 may, in one embodiment, be constructed entirely from a conductive material in the form of metal or the like. In one possible embodiment, by virtue of such structure, a "quad" antenna may be provided with one or more antenna elements that form a round, square, or otherwise-shaped loop/structure that splits what would otherwise be a wideband antenna. In other embodiments, the bezel 204 and/or back plate 206 may be constructed, at least in part, with conductive material incorporated using any desired process. For instance, in one embodiment, laser direct structuring (LDS) may be used to dope a thermoplastic material with a metal-plastic additive activated by way of a laser, to afford any requisite conductivity on the part of the antenna.

Figure 3:
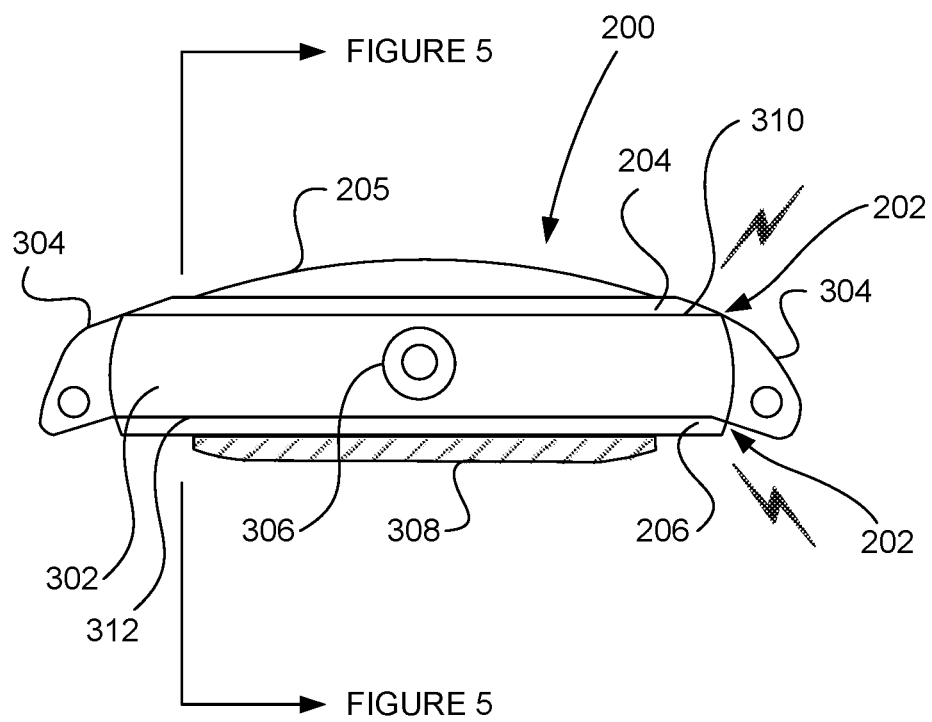
FIG. 3 is a side view of the watch of FIG. 2 taken along line 3-3 shown in FIG. 2.

FIG. 3 is a side view of the watch 200 of FIG. 2 taken along line 3-3 shown in FIG. 2. As shown, the watch 200 includes a body 302 that is situated between the bezel 204 and the back plate 206. In the present embodiment, insulators (not shown) may be positioned between the body 302, and the bezel 204 and back plate 206, as will be described later. In other embodiments, the body 302 may be integrally formed with the bezel 204 and/or back plate 206.

With continuing reference to FIG. 3, the body 302 is equipped with a pair of side arms 304 integrally formed thereon for attaching straps (not shown). The body 302 also includes a crown 306 for providing user input (e.g. for selection purposes, etc.). In other embodiments, it is contemplated that the crown 306 may be supplemented and/or replaced with pushers and/or any other desired input mechanism(s).

As further shown, the back plate 206 has an insulated region 308 that is situated thereon to abut skin of a user when the watch 200 is worn. In one embodiment, the insulated region 308 may be centrally situated on an outer surface of the back plate 206. Further, in one embodiment, the insulated region 308 may take on the same shape as the back plate 206.

For insulation purposes, a first insulative ring 310 is positioned between the bezel 204, and the body 302. Further, a second insulative ring 312 is positioned between the body 302, and the back plate 206. More information regarding such insulative rings 310, 312 will be set forth hereinafter during the description of subsequent figures.

Figure 4:
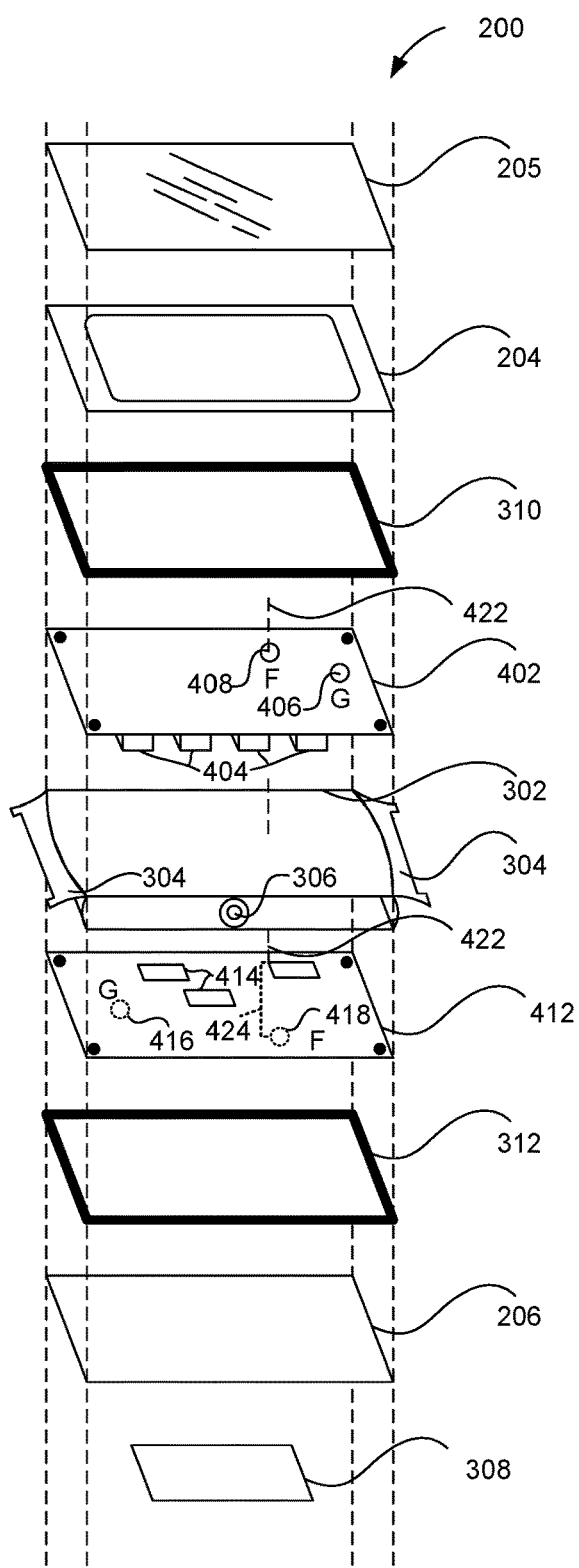
FIG. 4 is an exploded view of a watch, in accordance with another embodiment.

FIG. 4 is an exploded view of the watch 200, in accordance with another embodiment. While the watch 200 has been shown to be oval-shaped in previous figures, the watch 200 is shown to be rectangle-shaped in FIG. 4, in order to emphasize the fact that the watch 200 may take absolutely any shape desired.

As shown, further included is a first structure 402 with a plurality of electronic components 404 mounted thereunder. In another embodiment, the plurality of electronic components 404 may be mounted on a top surface (or any other part) of the first structure 402. The first structure 402 includes a ground contact 406 and a feed contact 408 mounted on top of the first structure 402 and in electrical communication with at least one of the electronic components 404 that operate to excite the bezel 204 so as to serve as an antenna. In another embodiment, the bezel 204 may be excited without the use of the ground contact 406. While not shown, the ground contact 406 and the feed contact 408 may also be connected to a matching circuit. Further, mounted in the bezel 204 is the watch face 205.

As will soon become apparent, the first structure 402 is configured for being mounted in an upper region of the body 302 such that the ground contact 406 and the feed contact 408 remain in electrical communication with the bezel 204 during use. For insulation purposes, the first insulative ring 310 is positioned between the bezel 204, and the body 302. In various embodiments, the first insulative ring 310 may be construed from any desired insulative material including, but not limited to an elastomeric material in the form of plastic, rubber, or the like.

Also provided is a second structure 412 with a plurality of electronic components 414 mounted on a top surface thereof. In another embodiment, the plurality of electronic components 414 may be mounted on a bottom surface (or any other part) of the second structure 412. The second structure 412 further includes a ground contact 416 and a feed contact 418 mounted beneath the second structure 412 and in electrical communication with at least one of the electronic components 414 of the second structure 412 that operate to excite the back plate 206 so as to serve as another antenna.

As will soon become apparent, the second structure 412 is configured for being mounted in a lower region of the body 302 such that the ground contact 416 and the feed contact 418 remain in electrical communication with the bezel 204 during use. For insulation purposes, the second insulative ring 312 is positioned between the body 302, and the back plate 206.

In various embodiments, the first structure 402 and the second structure 412 may take the form of separate printed circuit boards (PCBs). In other embodiments, the form of the first structure 402 and/or the second structure 412 may differ. For example, in one embodiment, one or both of the structures 402, 412 may take the form of a flexible circuit.

Still yet, the shape and/or size of the structures 402, 412 may, in one embodiment, be the same (or similar), while, in other embodiments, the structures 402, 412 may be configured differently. For example, in one embodiment, the first structure 402 may take the form of a primary structure that is larger and includes more electronic components as compared to the second structure 412 which may, in such embodiment, take the form of a secondary structure. In such embodiment, the first structure 402 may be sized to match or substantially match the size of the body 302 (which may accommodate more electronic componentry), as a result of the separation and use of the bezel 204 and back plate 206 as antennas.

Together, the insulative rings 310, 312 serve to ensure that the bezel 204 and the back plate 206 are properly insulated from the remaining components described hereinabove, to optimize their role as antennas. Similarly, an insulated region 308 may be positioned beneath the back plate 206 to prevent conductive contact with skin of a user, to further optimize use of the back plate 206 as an antenna. Further, the separation/isolation of the structures 402, 412 (and the current flowing thereon to feed the corresponding antenna) further promotes isolation of the bezel 204 and the back plate 206, to enhance dual antenna operation. Further, by virtue of the foregoing features (e.g. insulation via rings 310, 312, etc.), no clearance is necessarily required between the structures 402, 412 and the body 302, since insulation is provided by other mechanisms. This, in turn, may further reduce design complexity, while providing for larger structures 402, 412 to facilitate routing among components (e.g. electronic components 404, 414, etc.) mounted thereon.

Additionally, the contacts 406, 408 of the first structure 402 may be distanced from each other (along with the contact thereof to the antenna), in the manner shown, to set a corresponding resonating frequency and further enhance antenna operation in connection with the bezel 204. Similar measures may also be taken in connection with the contacts 416, 418 of the second structure 412 to enhance antenna operation in connection with the back plate 206. Still yet, the relative positions of the contacts 406, 408 and 416, 418 on the structures 402, 412 may be misaligned to maintain the feeds and/or grounds sufficiently distanced to even further enhance antenna operation.

For example, the feed contact 408 (that excites the bezel 204) may be positioned proximate a first side edge of the first structure 402, while the feed contact 418 (that excites the back plate 206) may be positioned proximate a second side edge of the second structure 412. To this end, an axis 422 that perpendicularly passes through the feed contact 408 is misaligned (e.g. offset, etc.) a certain distance 424 from the feed contact 418, as shown. By virtue of such misalignment of the feed contact 408 and the feed contact 418, additional distance is afforded therebetween which, in turn, provides additional isolation (e.g. in the form of air space, etc.) between the sources of excitation of the bezel 204 and the back plate 206. Such additional isolation thus reduces any potential interference during use of the bezel 204 and the back plate 206 as antennas.

Figure 5:
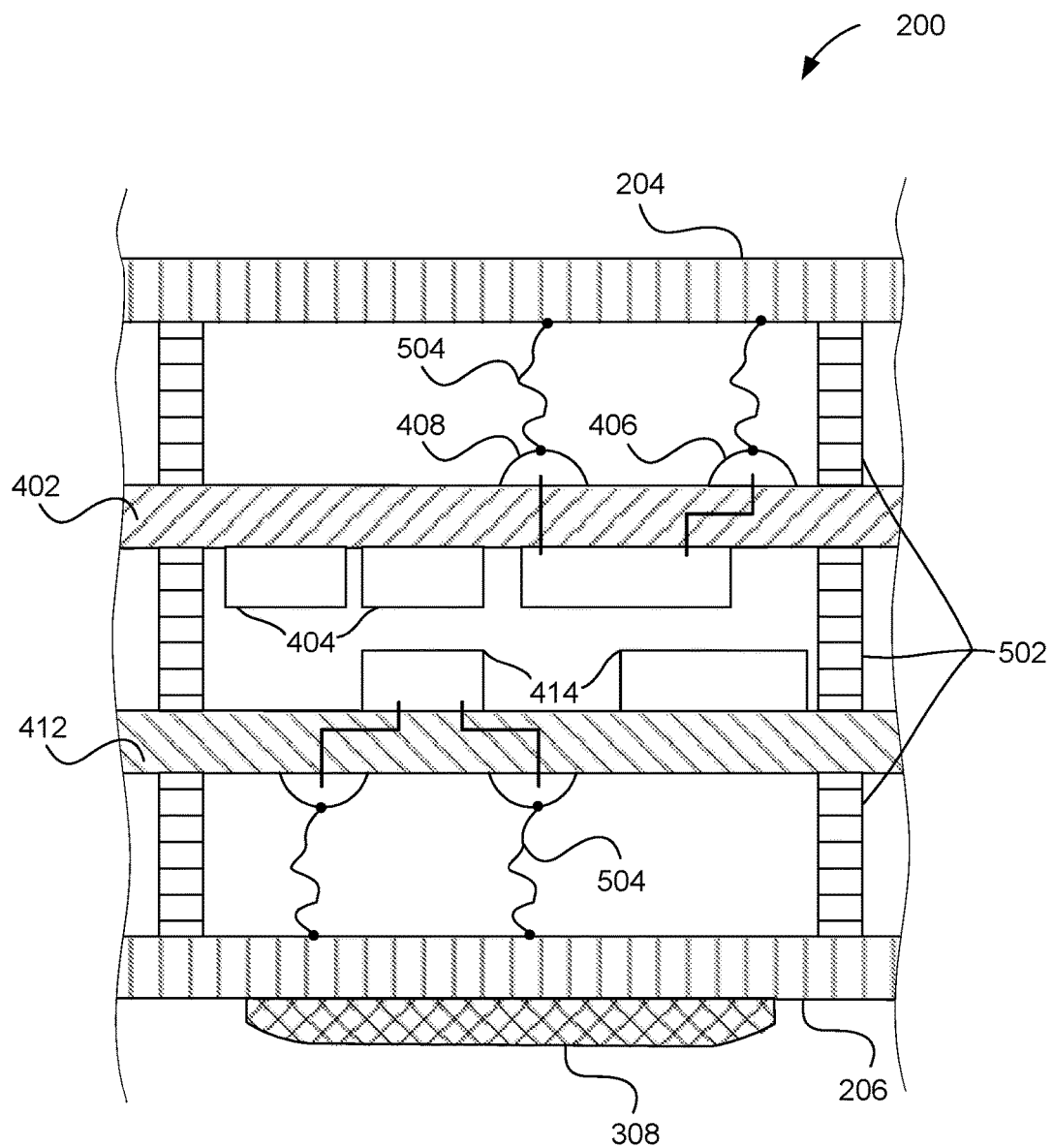
FIG. 5 is a cross-sectional view of the watch of FIGS. 2-3 taken along line 5-5 of FIG. 3.

FIG. 5 is a cross-sectional view of the watch 200 of FIGS. 2-4 taken along line 5-5 of FIG. 3. As shown, the different structures 402, 412 each reside in different spaced, parallel planes with insulation (e.g. air and/or any other insulative material, etc.) therebetween. Further, the different structures 402, 412 are maintained in spaced relationship with the bezel 204 and the back plate 206 via a plurality of insulative posts 502. In other embodiments, the insulative posts 502 may be conductive.

To this end, the watch 200 is formed of specific components, each stacked as layers, one top of the other, in the following order (starting on top and working to the bottom): the bezel 204 (serving as a first antenna), the first structure 402, the second structure 412, and the back plate 206 (serving as a second antenna). Further, insulative free space or other material may or may not be positioned between each of the aforementioned layers. Thus, the second structure 412 is positioned beneath the first structure 402 and is spaced from the first structure 402, in the manner shown.

In various embodiments, the different structures 402, 412 may be connected using flexible circuitry. Still yet, the bezel 204 and the back plate 206 may be fed (e.g. excited, etc.) via a plurality of electrical connections 504. It should be noted that the foregoing mechanisms by which the different structures 402, 412, the bezel 204, the back plate 206 are maintained fixedly secured in the body 302 and electrical communication is provided to the antennas, may vary as desired.

Figure 6:
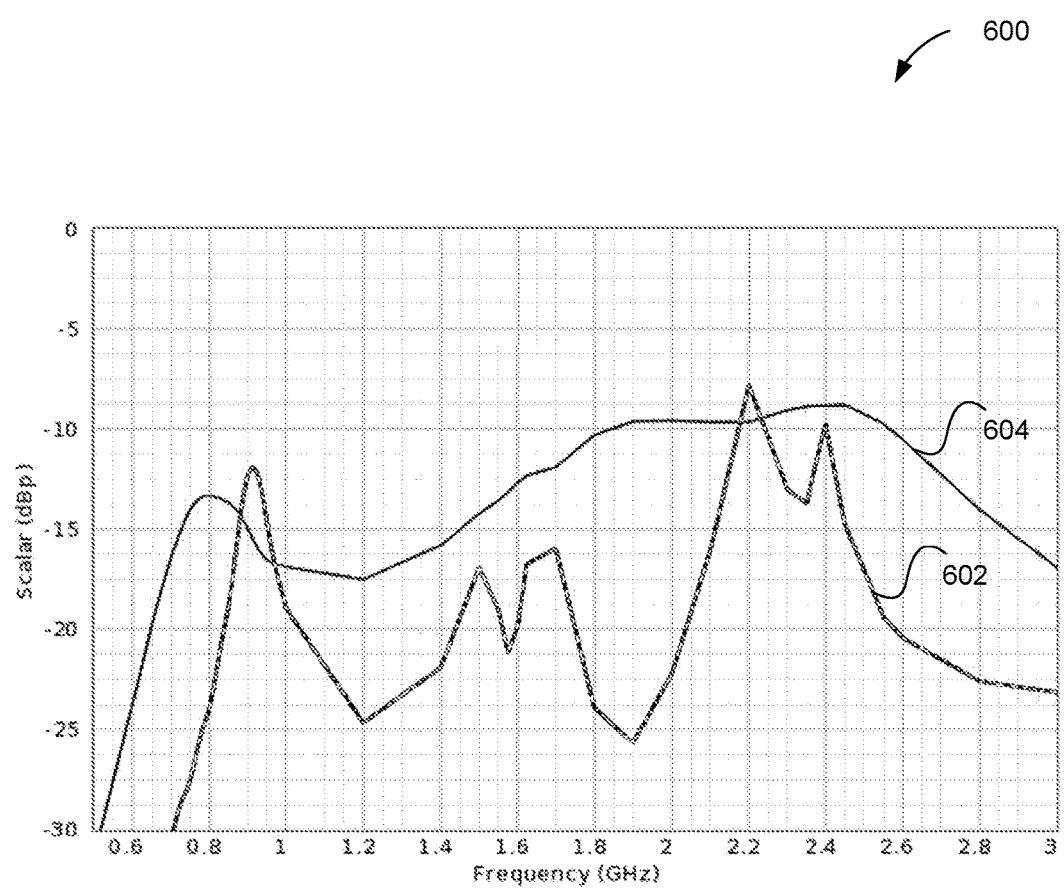
FIG. 6 is a signaling diagram showing sample antenna performance of the watch of FIGS. 2-5 while situated on a wrist of a user.

FIG. 6 is a signaling diagram 600 showing sample antenna performance of the watch 200 of FIGS. 2-5 while situated on a wrist of a user. As shown, a first signal 602 reflects antenna radiation performance/system efficiency of a bezel antenna (e.g. the bezel 204 of the watch 200 of FIGS. 2-5, etc.), while a second signal 604 reflects antenna radiation performance/system efficiency of a back face antenna (e.g. the back face 206 of the watch 200 of FIGS. 2-5, etc.). As shown, performance/system efficiency of the two antennas are effective over a similar, wide range of frequencies. In one embodiment, the bezel and/or back face of the watch may be configured as a quarter-wave matched monopole antenna.

Figure 7:
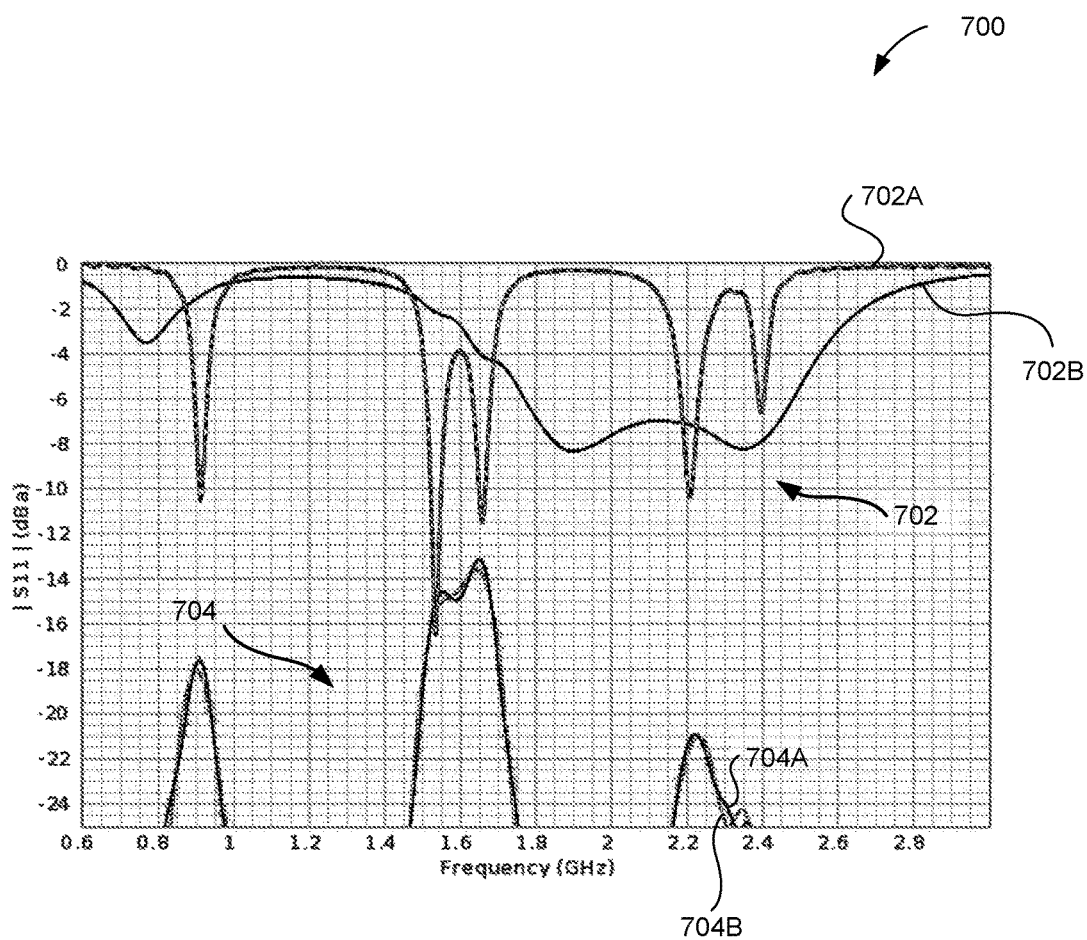
FIG. 7 is a signaling diagram showing sample antenna return loss/S11 (dB) and an isolation/coupling performance (S21/12) (dB) in connection with the watch of FIGS. 2-5 while situated on a wrist of a user.

FIG. 7 is a signaling diagram 700 showing sample antenna return loss/S11 (dB) 702 and an isolation/coupling performance (S21/12) (dB) 704 in connection with the watch 200 of FIGS. 2-5 while situated on a wrist of a user. As shown, a first signal 702A reflects antenna return loss of a bezel antenna (e.g. the bezel 204 of the watch 200 of FIGS. 2-5, etc.), while a second signal 702B reflects return loss of a back face antenna (e.g. the back face 206 of the watch 200 of FIGS. 2-5, etc.).

Further, a third signal 704A reflects system isolation of a bezel antenna (e.g. the bezel 204 of the watch 200 of FIGS. 2-5, etc.), while a fourth signal 704B reflects isolation of a back face antenna (e.g. the back face 206 of the watch 200 of FIGS. 2-5, etc.). As illustrated by signals 704A, 704B, enhanced low-band isolation (e.g. better than −10 dB, etc.) is exhibited at low frequencies, particularly below 1 Ghz, which may serve small environments (such as a watch) well in connection with advanced signaling protocols (e.g. 4G/LTE/LTE-Advanced, etc.).

In one embodiment, such enhanced performance may be achieved by specifically utilizing two physically-distanced components of a watch (e.g. bezel and back plate, etc.) to serve as separate antennas. By utilizing such specific physically-separated components of the watch in a conformal fashion, each of such different components may be dedicated to a particular band required by certain telecommunication protocols (e.g. 4G/LTE/LTE-Advanced, etc.) without necessarily requiring additional components which, in turn, may reduce design complexity, in some embodiments.

Further, additional electrical insulation may be afforded to further isolate the antennas to support such enhanced performance. Specifically, such additional electrical insulation may take the form of one or more insulative annular rings between the bezel and back plate. Still yet, as mentioned earlier, additional spacing may be provided between contacts that excite the relative antennas (e.g. by positioning them on separate supporting structures, misaligning their positions, etc.) to provide further performance-enhancing isolation (e.g. in the form of air space insulation, etc.).

Figure 8:
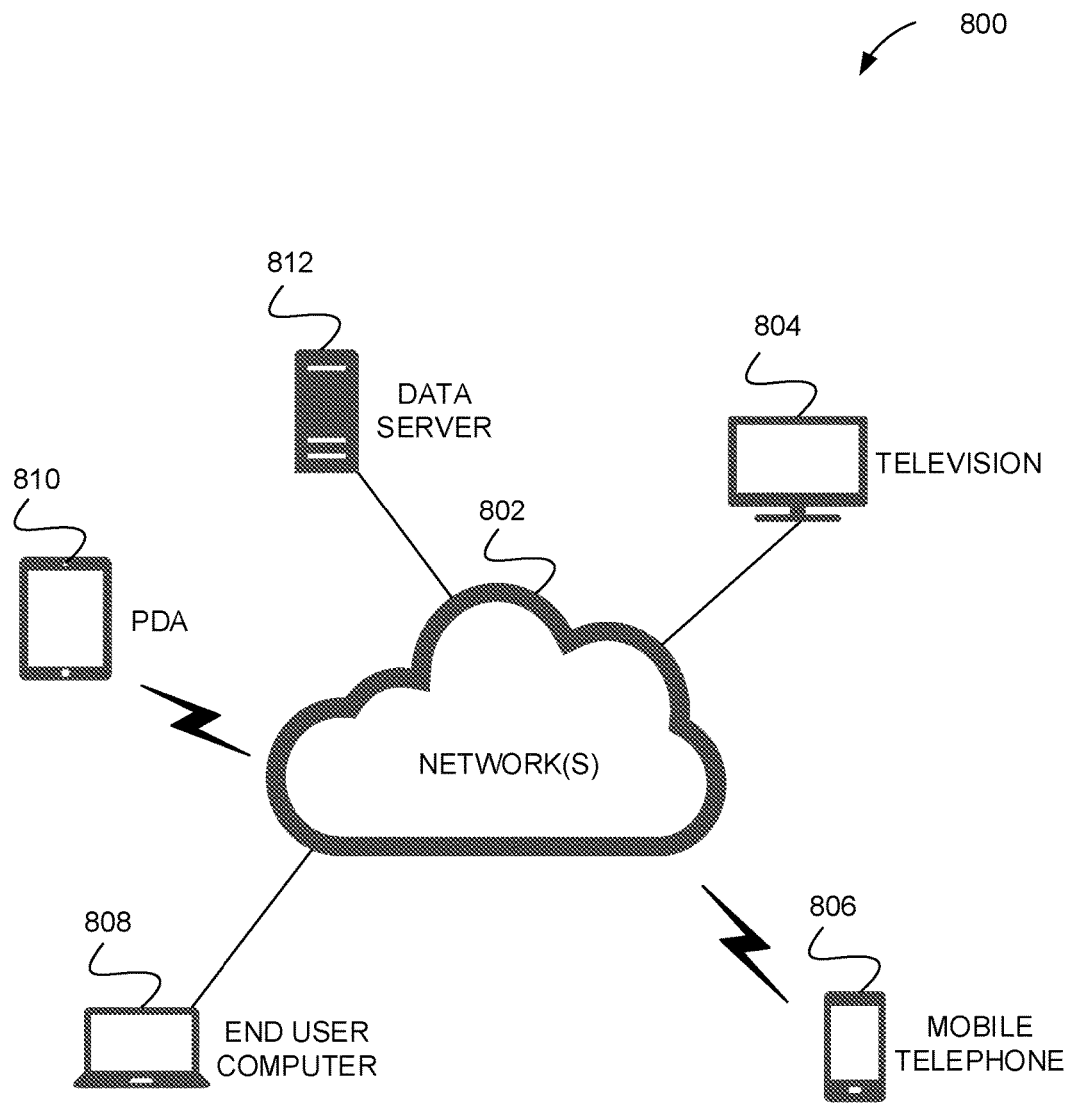
FIG. 8 illustrates a network architecture, in accordance with one embodiment.

FIG. 8 illustrates a network architecture 800, in accordance with one embodiment. In one embodiment, any watch of one or more of the previous embodiments may be configured for operating in connection with the network architecture 800. As shown, at least one network 802 is provided. In the context of the present network architecture 800, the network 802 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 802 may be provided.

Coupled to the network 802 is a plurality of devices. For example, a server computer 812 and an end user computer 808 may be coupled to the network 802 for communication purposes. Such end user computer 808 may include a desktop computer, lap-top computer, and/or any other type of logic. Still yet, various other devices may be coupled to the network 802 including a personal digital assistant (PDA) device 810, a mobile phone device 806, a television 804, etc.

Figure 9:
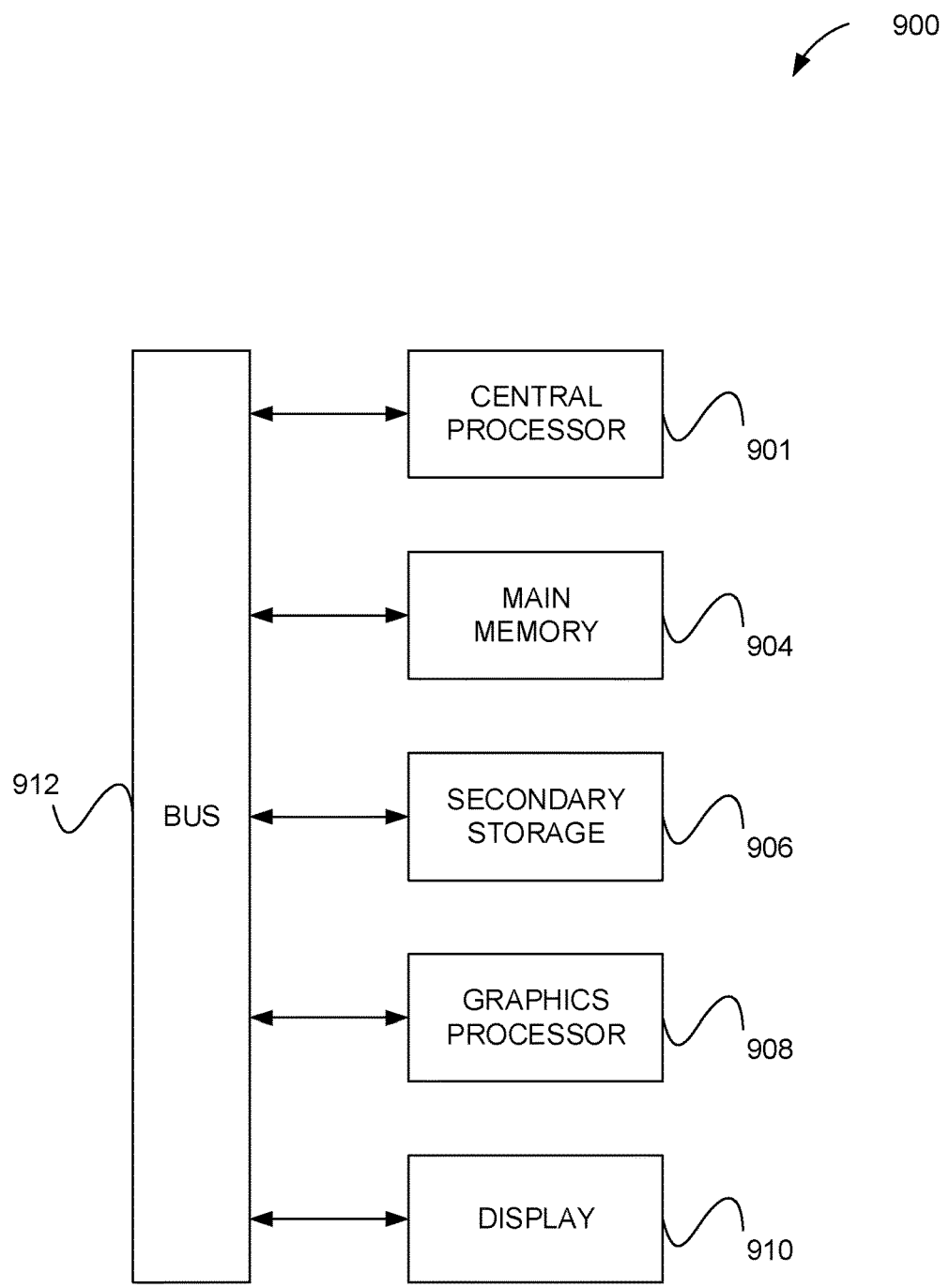
FIG. 9 illustrates an exemplary system, in accordance with one embodiment.

FIG. 9 illustrates an exemplary system 900, in accordance with one embodiment. As an option, the system 900 may be implemented in the context of any of the devices of the network architecture 800 of FIG. 8, including a watch disclosed in one or more of the embodiments described hereinabove. Just by way of example, the wearable article 100 of FIG. 1 and/or the watch 200 of FIG. 2 may be equipped with one or more of the components of the system 800. Of course, the system 800 may be implemented in any desired environment.

As shown, a system 900 is provided including at least one central processor 901 which is connected to a bus 912. The system 900 also includes main memory 904 [e.g., hard disk drive, solid state drive, random access memory (RAM), etc.]. The system 900 also includes a graphics processor 908 and a display 910.

The system 900 may also include a secondary storage 906. The secondary storage 906 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 904, the secondary storage 906, and/or any other memory, for that matter. Such computer programs, when executed, enable the system 900 to perform various functions (as set forth above, for example). Memory 904, secondary storage 906 and/or any other storage are possible examples of non-transitory computer-readable media.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. An apparatus, comprising:
a wearable article including:
a body;
a first structure positioned in the body;
a plurality of first electronic components mounted on the first structure;
a second structure positioned in the body beneath and spaced from the first structure;
a plurality of second electronic components mounted on the second structure;
a first insulative ring which is in the body and positioned between the first structure and a first antenna;
the first antenna in electrical communication with at least one of the first electronic components;
a processing circuitry for multiplexing outgoing radio frequency signals in time and space by exciting the first antenna during a first time period by the at least one of the first electronic components mounted on a first printed circuit and by exciting a second antenna during a second time period by the at least one of the second electronic components mounted on a second printed circuit which is separate from the first printed circuit wherein the second time period is different from the first time period;
a second insulative ring which is in the body and positioned between the second structure and the second antenna; and
the second antenna in electrical communication with at least one of the second electronic components.

2. The apparatus of claim 1, wherein each of the plurality of antennas is attached to the body.

3. The apparatus of claim 1, wherein the wearable article includes a watch.

4. The apparatus of claim 3, wherein at least one of the plurality of antennas is included as at least a part of a bezel of the watch.

5. The apparatus of claim 3, wherein at least one of the plurality of antennas is included as at least a part of a back plate of the watch.

6. The apparatus of claim 5, wherein the back plate of the watch includes an insulated region that is situated thereon to abut skin of the mammal when the watch is worn.

7. The apparatus of claim 1, wherein the plurality of antennas are attached to different portions of the wearable article.

8. The apparatus of claim 7, wherein insulation is positioned between the different portions of the wearable article.

9. The apparatus of claim 1, wherein the second structure is attached to the body so as to be at least partially electrically isolated from the first structure as a result of an air space there between.

10. The apparatus of claim 1, wherein the second structure is attached to the body so as to be at least partially electrically isolated from the first structure as a result of an insulation there between.

11. The apparatus of claim 1, wherein the first structure and the second structure each reside in different spaced, parallel planes.

12. The apparatus of claim 11, wherein the plurality of antennas are excited using different contacts that are misaligned.

13. The apparatus of claim 1, and further comprising an active tuner for exciting at least one of the plurality of antennas.

14. The apparatus of claim 1, wherein the plurality of antennas is configured for radiating cellular radio frequency (RF) signals.

15. The apparatus of claim 1, wherein the plurality of antennas take a form of a multiple-in-multiple-out (MIMO) antenna.

16. The apparatus of claim 1, wherein at least one of the plurality of antennas is positioned inside the body of the wearable article.

17. The apparatus of claim 1, wherein at least one of the plurality of antennas is positioned outside the body of the wearable article.

18. A method performed by a processing circuitry for multiplexing outgoing radio frequency signals in time and space, comprising:
exciting, by at least one of a plurality of first electronic components mounted on a first printed circuit board of a first structure, a first antenna of a wearable article during a first time period, wherein a first insulative ring is positioned between the first structure and a first antenna; and
exciting, by at least one of a plurality of second electronic components mounted on a second printed circuit board of a second structure which is separate from the first printed circuit board, a second antenna of the wearable article during a second time period that does not overlap with the first time period when the first antenna is excited, wherein a second insulative ring is positioned between the second structure and the second antenna.

19. An apparatus, comprising:
a watch including:
a body;
a strap attached to the body for coupling the watch to a wrist; a first structure attached to the body and including a plurality of first electronic components;
a second structure attached to the body beneath and spaced from the first structure, and including a plurality of second electronic components:
a first insulative ring which is in the body and positioned between the first structure and a conductive bezel;

the conductive bezel attached to the body and in electrical communication with at least one of the first electronic components in the first structure;

a processing circuitry for multiplexing outgoing radio frequency signals in time and space by exciting the conductive bezel for operating as a first antenna during a first time period by the at least one of the first electronic components mounted on a first printed circuit and by exciting a second antenna during a second time period by the at least one of the second electronic components mounted on a second printed circuit which is separate from the first printed circuit wherein the second time period is different from the first time period; and a conductive back face attached to the body and in electrical communication with at least one of the second electronic components in the second structure.

* * * * *